United States Patent [19]

Monteiro Vieira

[11] Patent Number: 5,673,674
[45] Date of Patent: Oct. 7, 1997

[54] FUEL SAVER

[75] Inventor: Jorge Monteiro Vieira, Sao Paulo, Brazil

[73] Assignee: J.M.V. Engenharia e Consultoria S/C Ltda, Sao Paulo, Brazil

[21] Appl. No.: 625,900

[22] Filed: Apr. 1, 1996

[30] Foreign Application Priority Data

Mar. 30, 1995 [BR] Brazil .................... 9501304

[51] Int. Cl.[6] .................................. C02F 1/48
[52] U.S. Cl. .................................. 123/538
[58] Field of Search ................ 123/536, 537, 123/538, 539; 210/222, 695

[56] References Cited

U.S. PATENT DOCUMENTS

| | | | |
|---|---|---|---|
| 2,625,925 | 9/1953 | Vermeiren | 210/222 |
| 3,830,621 | 8/1974 | Miller | 210/222 |
| 4,372,852 | 2/1983 | Kovacs | 210/222 |
| 4,519,919 | 5/1985 | Whyte et al. | 210/695 |
| 4,879,045 | 11/1989 | Eggerichs | 210/695 |
| 5,329,911 | 7/1994 | Jeong | 123/538 |
| 5,536,401 | 7/1996 | Burns | 210/222 |

*Primary Examiner*—Marguerite McMahon
*Attorney, Agent, or Firm*—Jacobson, Price, Holman & Stern, PLLC

[57] ABSTRACT

A fuel saving device including a fuel multidirectional device located in a magnetic field. The multidirectional device includes a fuel reservoir and a plurality of spirals surrounding the reservoir for passage of fuel, in a turbulent manner, through a magnetic field.

3 Claims, 1 Drawing Sheet

FUEL SAVER

FIELD OF THE INVENTION

The present invention relates to a fuel saving device for producing vibrations in a fuel supply by locating a fuel multidirectional device in a magnetic field.

BACKGROUND OF THE INVENTION

This invention has the main purpose of providing fuel economy for internal combustion engines, where the combustion loss and the outcome efficiency and yields are presently influenced by incomplete burning due to a limited oxygen/hydrocarbon fuel rate. This poor combustion results in a high carbon monoxide content in the exhaust gases. Therefore, incomplete burning, besides lowering the engine efficiency and having high fuel consumption, impacts to a huge extent on air pollution.

There are several electronic apparatuses to obtain a fine adjustment and a correct balance for fuel injection in an engine, according to the amount of air necessary according to fuel feed needs for a required power.

SUMMARY OF THE INVENTION

This invention provides for a proper running of an internal combustion engine by affecting the fuel passing through the fuel saver apparatus which gives the fuel special characteristics like higher flame burning speed during combustion so as to totally fill the engine internal piston chamber with a high turbulence mixture. This means improves fuel characteristics in the air fuel mixture during the mixture vaporization and providing a better distribution of fuel in the engine internal piston chamber. So, as the speed of combustion in the engine internal piston chamber improves, a smooth and better running of the engine results in several ways and with increased velocities. Thus, the improvement of the combustion gives prompt results to engine performance, saving fuel and with a reduction of the amount of carbon monoxide present in the exhaust gases.

The present invention could be used in any type of carburetor or fuel electronic injection engine, or even with a solid or mechanical injection, like a Bosch injection pump for Diesel engines.

The developed apparatus acts to improve the fuel reaction with oxygen in the air causing an increase in contact between oxygen and fuel during their reaction time. The invention acts to increase the interpenetration particle speed in the air and fuel mixture. In this way, the fuel particles are pre-accelerated having movement due to continuous vibration to promote an atomization and true vibration movement that causes high reaction speed around the overall engine internal piston chamber.

Therefore, the present invention produces a better fuel combustion or burning in the engine internal piston chamber. A magnetic field is generated around the passing fuel and the geometric distribution of fuel provided by the fuel saver apparatus produces a vibrating movement of the fuel particles. In this case, the fuel saver apparatus provides a peculiar flow pattern which works differently from a mass spectrometer which only accelerates the ions which are detectable by a magnetic field.

The fuel saver apparatus has the basic principle to accelerate the fuel particles in several directions during a predetermined space of time creating a very intensive vibration.

These and other objects of the invention, as well as many of the intended advantages thereof, will become more readily apparent when reference is made to the following description taken in conjunction with the accompanying drawings.

BRIEF DESCRIPTION OF THE DRAWINGS

For a better understanding of the apparatus, this will be explained on the basis of the attached drawings where.

DETAILED DESCRIPTION OF THE PREFERRED EMBODIMENTS

Figure 1:
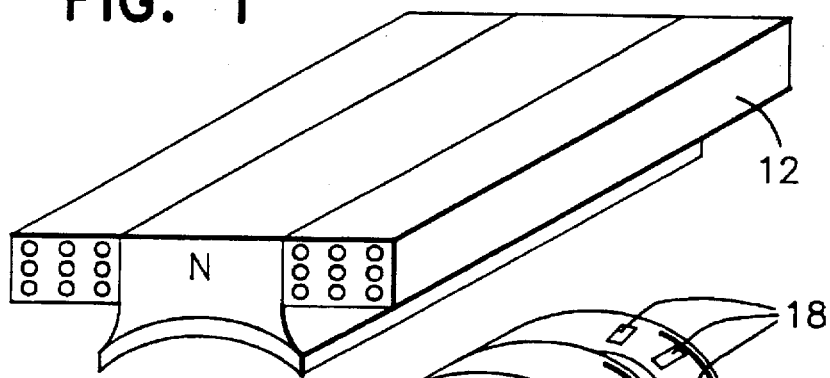
FIGS. 1 and 2 are perspective views of the magnetic field coils.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 3:
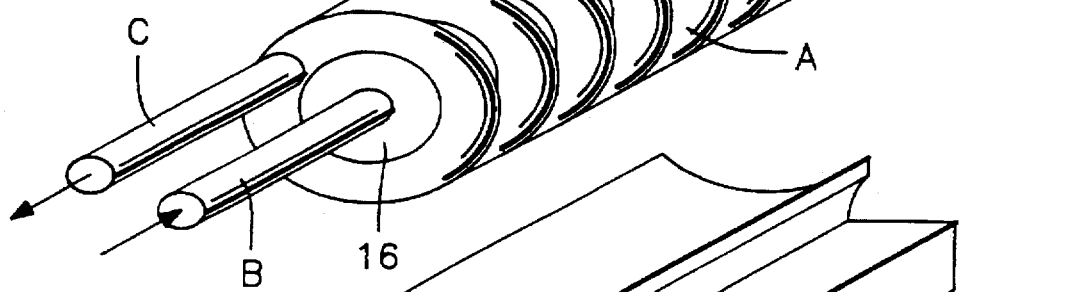
FIG. 3 is a perspective view of the fuel multidirectional system.
Figure 2:
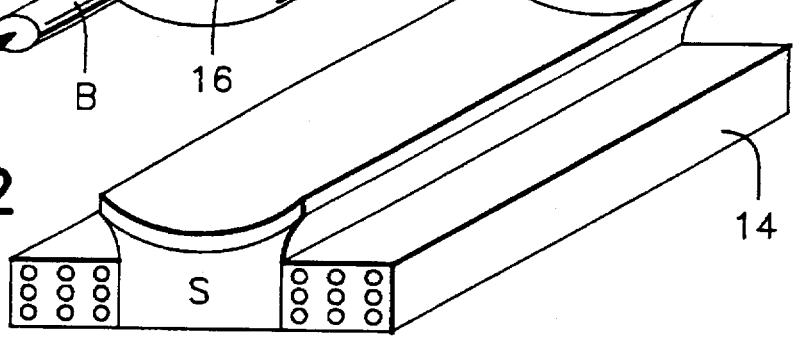

The apparatus has a fuel multidirectional device 10 which, as shown in FIG. 3, is to be placed into a magnetic field which is produced by two or more coils 12 and 14, as shown in FIGS. 1 and 2, which generate a magnetic field therebetween. The coil 12 generates an "N" field, whereas the coil 14 generates an "S" field.

The assembled system of two coils 12, 14 of opposite polarity, with the fuel device 10 located therebetween, looks like a heat exchanger, with a spiral channel that makes the fuel flow turn around its axis several turns as the fuel passes through the magnetic field. The fuel stream is turned around several times within the magnetic field causing different ions to be excited in different directions according to the positive or negative magnetic fields impacting on the ions.

At the entrance to fuel device 10 are placed several tablets measuring 6 mm by 4 mm. The tablets 18 made of an iron oxide catalyst are placed inside of a small fuel reservoir 16. The tablets have the double function of a porous filter and iron oxide muffler that increases the contact of the liquid fuel with the magnetic field as well as allowing oxygen distribution. The magnetic field of the fuel saver apparatus is generated by electrical coils 12, 14 by passing 12 volts of direct current through a core of siliceous iron.

The present invention refers to a special apparatus with two purposes: to save fuel and to reduce the pollution emissions of gases exhausted to the atmosphere from an engine.

The invention includes an apparatus composed of a fuel multi-directional device 10 placed in a magnetic field generated by two or more coils 12, 14, which generate the magnetic field. The fuel enters through inlet B and passes through reservoir 16. The fuel particles pass from reservoir 16 through one or more spiral channels A and exit from outlet C to the engine. The fuel particles are affected the entire time passing through device 10 by the surrounding magnetic field generated between coils 12 and 14.

In the initial reservoir 16, the system works like a filter and diffuser due to its large porous area, increasing diffusion of the liquid, resulting from contact with iron oxide tablets and also improving the oxygen distribution contained in the fuel flow.

Having described the invention, many modifications thereto will become apparent to those skilled in the art to which it pertains without deviation from the spirit of the invention as defined by the scope of the appended claims.

I claim:

1. A fuel saver for the treatment of fuel being fed to a fuel feeding system of an internal combustion engine, said fuel saver comprising:

a fuel multidirectional device having an inlet for passage of fuel therethrough, said inlet leading to a fuel reservoir, iron oxide tablets being located in said reservoir, and a magnetic field generated from opposite sides of said fuel multidirectional device for causing an increase in vibrations of fuel passing through said multidirectional device.

2. A fuel saver according to claim 1, wherein at least two coils generate said magnetic field.

3. A fuel saver according to claim 1, wherein at least one spiral channel of said multidirectional device passes through said magnetic field.

* * * * *